United States Patent
Nogueira-Nine (10) Patent No.: US 8,610,074 B2
(45) Date of Patent: Dec. 17, 2013

(54) PASSIVE RADIOMETRIC IMAGING DEVICE AND CORRESPONDING METHOD

(75) Inventor: Juan Nogueira-Nine, Stuttgart (DE)

(73) Assignee: Sony Corporation, Tokyo (JP)

( * ) Notice: Subject to any disclaimer, the term of this patent is extended or adjusted under 35 U.S.C. 154(b) by 482 days.

(21) Appl. No.: 12/939,514

(22) Filed: Nov. 4, 2010

(65) Prior Publication Data
US 2011/0147593 A1    Jun. 23, 2011

(30) Foreign Application Priority Data
Dec. 22, 2009  (EP) .................................. 09180363

(51) Int. Cl.
*G01T 1/29*    (2006.01)

(52) U.S. Cl.
USPC ..................................................... 250/358.1

(58) Field of Classification Search
USPC ......................................... 250/358.1, 339.14
See application file for complete search history.

(56) References Cited

U.S. PATENT DOCUMENTS

| | | | |
|---|---|---|---|
| 6,384,414 B1 * | 5/2002 | Fisher et al. ............. | 250/339.14 |
| 7,616,306 B2 * | 11/2009 | Brady et al. ................. | 356/326 |
| 7,912,527 B2 * | 3/2011 | Robertson et al. ........... | 600/407 |
| 2007/0221847 A1 | 9/2007 | Lettington et al. | |

OTHER PUBLICATIONS

Emmanuel Candes et al., "Robust Uncertainty Principles: Exact Signal Reconstruction from Highly Incomplete Frequency Information", IEEE Transactions on Information Theory, vol. 52, 2006, 41 pages.

David L. Donoho, "Compressed Sensing", IEEE Transactions on Information Theory, vol. 52, No. 4, Apr. 2006, 18 pages.
Richard G. Baraniuk, "Compressive Sensing", IEEE Signal Processing Magazine, Jul. 2007, 4 pages.
Emmanuel J. Candes et al., "An Introduction to Compressive Sampling", IEEE Signal Processing Magazine, Mar. 2008, 10 pages.
Marco F. Duarte et al., "Single-Pixel Imaging via Compressive Sampling", IEEE Signal Processing Magazine, Mar. 2008, 9 pages.
Justin Romberg, "Imaging via Compressive Sampling", IEEE Signal Processing Magazine, Mar. 2008, 7 pages.
Michael Lustig et al., "Sparse MRI: The Application of Compressed Sensing for Rapid MR Imaging", Magnetic Resonance in Medicine, vol. 58, No. 6, 2007, 42 pages.
N.A. Salmon et al., "Digital Beam-Forming for Passive Millimetre Wave Security Imaging", Antennas and Propagation, 2007, EuCAP 2007, Nov. 2007, 11 pages.
R. Fletcher et al., "Function minimization by conjugate gradients", The computer Journal, vol. 7, No. 2, 1964, 6 pages.
U.S. Appl. No. 13/053,808, filed Mar. 22, 2011, Nogueira-Nine.

* cited by examiner

*Primary Examiner* — David Porta
*Assistant Examiner* — Faye Boosalis
(74) *Attorney, Agent, or Firm* — Oblon, Spivak, McClelland, Maier & Neustadt, L.L.P.

(57) ABSTRACT

The present invention relates to a passive radiometric imaging device and a corresponding method for scanning a scene. The proposed device comprises a radiometer that detects radiation emitted in a predetermined spectral range from a spot of said scene and for generating a radiation signal from said detected radiation, a spot movement means that effects a movement of the spot, from which the radiation is detected, to various positions, a controller that controls said spot movement means to effect the movement of the spot from one position to another position after a random time interval, and a processor that processes the radiation signals detected from the spot at said various positions and for reconstructing an image of said scene by applying compressive sensing. With this device an increase of the temperature resolution of the reconstructed image can be obtained.

16 Claims, 6 Drawing Sheets

$$y \quad \Phi = I \quad x$$

PASSIVE RADIOMETRIC IMAGING DEVICE AND CORRESPONDING METHOD

FIELD OF INVENTION

The present invention relates to a passive radiometric imaging device and a corresponding method for scanning a scene. Further, the present invention relates to a computer readable non-transitory medium and computer program for implementing said method.

BACKGROUND OF THE INVENTION

Millimetre waves are radio waves in the wavelength range from 1 mm to 10 mm, which corresponds to a frequency range from 30 GHz to 300 GHz. These waves have been applied to in-vehicle radar devices for measuring the distance between moving vehicles in order to prevent collisions and to high speed wireless communications for achieving transmission data rate in the order of several gigabits per second. Further, improved generation and detection techniques as well as latest improvements in the integration and miniaturization of devices operating in the millimetre wave frequency range have created a lot of interest to exploit the properties of this electromagnetic radiation. Its ability to penetrate non metal materials, including plastics, walls, clothes, smoke and fog have provided additional momentum to research on millimetre waves imaging applications. Furthermore, the achievable spatial resolution of few millimetres is very interesting in security applications like concealed weapon or explosives detection.

The millimetre waves can be used in an active or a passive way. A passive radiometric imaging system creates images by capturing the electromagnetic radiation emitted by the objects by using a radiometer. Such a passive radiometric imaging system is, for instance, known from US 2007/0221847 A1. An active radiometric imaging system, on the other hand, irradiates millimetre waves to objects and creates images by detecting the transmitted or reflected waves. Millimetre waves do not produce ionizing effects, which makes this technology an attractive candidate to be employed in security applications like concealed weapon or explosives detection (existing technologies based on infrared or visible radiation can not detect concealed objects, and X-ray based systems can not be used in humans due to its ionizing effect).

SUMMARY OF INVENTION

It is an object of the present invention to provide a passive radiometric imaging device for imaging a scene having a reduced imaging time compared to known passive radiometric imaging devices for the same temperature resolution and/or having an increased temperature resolution. It is a further object of the present invention to provide a corresponding method as well as a corresponding computer readable non-transitory medium and a computer program for implementing said method on a computer.

According to an aspect of the present invention there is provided a passive radiometric imaging device for imaging a scene, said device comprising:
- a radiometer that detects radiation emitted in a predetermined spectral range from a spot of said scene and for generating a radiation signal from said detected radiation,
- a spot movement means that effects a movement of the spot, from which the radiation is detected, to various positions,
- a controller that controls said spot movement means to effect the movement of the spot from one position to another position after a random time interval, and
- a processor that processes the radiation signals detected from the spot at said various positions and for reconstructing an image of said scene by applying compressive sensing.

According to further aspects of the present invention there is provided a corresponding passive radiometric imaging method as well as a computer readable non-transitory medium having instructions stored thereon which, when carried out on a computer, cause the computer to perform the steps of processing and reconstructing of the claimed method in a claimed passive radiometric imaging device when said computer program is carried out on a computer. Finally, the present invention also relates to a corresponding computer program.

Preferred embodiments of the invention are defined in the dependent claims. It shall be understood that the claimed method and the claimed computer readable non-transitory medium have similar and/or identical preferred embodiments as the claimed device and as defined in the dependent claims.

A passive radiometric imaging device maps the brightness temperature distribution over a given scene (often also called "field of view" (FOV)) by scanning across the scene. The temperature resolution ($\Delta T$) of the image is consequently determined by the bandwidth of the antenna (B) of the radiometer, the noise temperature ($T_{SYS}$) of the imaging device and the integration time ($\tau$) according the formula:

$$\Delta T(°K) = \frac{T_{SYS}(°K)}{\sqrt{B(Hz)\tau(s)}}.$$

As can be derived from this formula, to increase the temperature resolution of the imaging device it is necessary either to reduce the noise temperature of the imaging device or to increase the bandwidth and/or the integration time. The radiometer measures the energy radiated by the scene being imaged at each position (or pixel) where the spot, i.e. the radiation beam, is positioned. The longer the radiometer measures at an actual position, the better will be the temperature resolution at this position. On the other hand, this increases the scanning time which is a non desirable characteristic. Hence, according to an element of the present invention it is proposed to obtain a high temperature resolution while reducing the acquisition time by applying the known compressive sensing method.

Conventional approaches for sampling signals or imaging follow the Shannon's theorem, which establishes that the sampling rate must be at least twice the maximum frequency present in the signal (also called Nyquist rate). This principle has been applied in nearly all signal acquisition protocols used in consumer audio or image electronics, medical imaging devices, digital communications, etc. When the signal is bandlimited, as it used to be in the digital communications field, to convert the analog signals into the digital domain requires the usage of analog-to-digital converters (ADCs), sampling at or above the Nyquist rate, which implicitly imposes a dependency of such systems on the ADC capabilities. For other signals like images, the required sampling rate is not dictated by the Shannon's theorem but by the desired temporal or spatial resolution. However, it is common to such systems to use antialiasing low-pass filters to bandlimit the signal before sampling, and then the Nyquist rate plays also here an important role.

The compressive sensing paradigm, as described, for instance, in E. Candes, J. Romberg, and T. Tao, "Robust uncertainty principles: Exact signal reconstruction from highly incomplete frequency information," IEEE Transactions on Information Theory, vol. 52, pp. 489-509, 2006 or D. Donoho, "Compressed sensing," IEEE Transactions on Information Theory, vol. 52, pp. 1289-1306, 2006, goes against that common wisdom in data acquisition, by asserting that it is possible to recover certain signals and images from far fewer samples or measurements than those required from the traditional methods. In contrast to the conventional sampling theorem, which assumes that the amount of information in a signal is proportional to its frequency content, compressive sensing proposes a new sampling paradigm in which the information content of the signal is determined by its sparsity level or by its degree of freedom. From this point of view, the signal of interest does not need to be sampled at Nyquist rate, but at its information rate, which—in most of the cases—is much less than its bandwidth.

Briefly summarized, the compressive sensing paradigm establishes that if a signal or image is sparse enough in some known domain, it can be reconstructed from a very few number of samples (much less than what Nyquist specifies), as far as the acquisition process can be randomized in some sense.

Hence, the present invention proposes reduce the scanning/imaging time of a passive radiometric imaging system by applying compressive sensing. To apply such a technique it is necessary first of all to find a measurements domain where the image has a sparse representation. Unfortunately the images obtained by a passive radiometric imaging device are not sparse in the acquisition domain of the radiometer, which is the total power radiated energy. Therefore the acquired radiation signals are mapped into a sparse domain. One characteristic of the images being considered here is that they are piecewise constant, and therefore one possibility is to use the total variation technique, as proposed according to an embodiment, for recovering the image from a small number of measurements, but other transformations are also possible.

The second condition to successfully apply compressive sensing is that the way the measurements are done has to be incoherent with the representation basis being used. The easiest way to ensure that, is to select a random measurement matrix, i.e. the acquisition process of the radiation signals needs to be randomized.

The solution proposed according to this invention includes to utilize the integration time as a means to achieve the necessary randomization in the acquisition process. In other words, according to an element of the present invention, the spot at which radiation is detected from the scene is moved from one position to another position after a random time interval, i.e. the time intervals are not equal but randomly determined. Here, "randomly" shall not be understood in a strict sense such as "truly randomly", but shall also include any pseudo-random behaviour that "simulates" a truly random behaviour and that can be generated, for instance, by a pseudo-random number generator or function.

Consequently, the compressive sensing technology can be applied in the reconstruction process of the image leading to the desired advantages over the known passive radiometric imaging devices and methods, in particular leading to the desired reduction in the scanning time.

According to a preferred embodiment the processor is adapted for reconstructing the image by applying a l1-norm minimization algorithm to said radiation signals. The l1-norm is generally known, and the l1-norm problem (also called least absolute deviations (LAD), least absolute errors (LAE)), least absolute value (LAV)) is a mathematical optimization technique similar to the popular least squares technique (l2-norm) that attempts to find a function which closely approximates set of data. In the simple case of a set of (x, y) data, the approximation function is a simple "trend line" in 2D Cartesian coordinates. The proposed method thus minimizes the sum of absolute errors (SAE) or some of "residuals" between points generated by the function and corresponding points in the data.

Applying the l1-norm minimization according to an embodiment of the present invention enables to recover an image of the scanned scene from the detected radiation signals, which are sparse in a known domain.

For effecting a movement of the spot, from which the radiation is detected, various embodiments of the spot movement means exist. According to one embodiment mechanic spot movement means are provided, in particular for mechanically moving the radiometer for effecting a movement of the spot. For instance, a motor may be provided by which an antenna of the radiometer is moved or by which the orientation of the antenna is varied, preferably in two dimensions. According to another embodiment a rotating mirror may be provided for changing the direction of the sensitivity profile of the radiometer.

According to another embodiment electronic spot movement means are provided for electronically moving the sensitivity profile of the radiometer. Such an embodiment may be implemented, for instance, by an electronic beam positioning means or an electronic beam forming means, which has the advantage that no mechanical means are provided and which generally is able to more quickly move the sensitivity profile of the radiometer compared to mechanical spot movement means.

In a further embodiment the spot movement means is adapted for effecting a continuous movement of the spot over the scene, wherein the speed of the continuous movement is randomly varied. Said random variation of the speed of the spot movement effects the randomization of the integration time of radiation detection. Such a speed variation can be effected both mechanical and electronic spot movement means.

Alternatively, the detection of the radiation can also be performed only, when the spot is not moving but stationary located at a fixed position. Hence, during the time when the spot is moved from one position to the next position, no radiation is detected, which, however, increases the total time required for scanning a scene compared to the above embodiment employing a continuous movement and continuous measurement.

Preferably, according to another embodiment, the spot movement means is adapted for effecting a movement of the spot such that the scene is completely scanned, in particular that the spot is sequentially moved over said scene along a continuous trajectory. Thus, no jumps of the spot to distinct, in particular not neighbouring positions on the scene are required which would increase the time for the complete acquisition of radiation signals. A continuous trajectory may be differently implemented, for instance by a meandering trajectory according to which the spot scans over the scene line by line or column by column.

As mentioned above, it is important for application of the compressive sensing technique that the radiation signals obtained from scanning the scene have a sparse representation in a know domain. For the applications envisaged by the present invention said known domain is preferably a total variation domain, a Fourier domain, wavelets domain or curvelets domain.

For control of the spot movement means to effect the movement of the spot various embodiments of the controller exist. According to one embodiment the controller is adapted for selecting the random time interval for which the spot remains at a position from a predetermined time interval or from a table of selectable time intervals. Hence, the selection of the time interval is randomized which is easily implemented, e.g. by an appropriate programming of a processor implementing said selection.

According to another embodiment the controller is adapted for determining the time interval for which the spot remains at a position by use of a predetermined function or distribution, in particular a uniform Bernoulli or Gaussian distribution. Hence, rather than providing a memory for storing predetermined time intervals or a table of selectable time intervals, a generator is provided for generating said predetermined function or distribution. For instance, a pseudo-random number generator can be applied for implementing said embodiment.

According to another preferred embodiment the controller is adapted for selecting the average time interval to be larger at positions, at which the scene has a higher information distribution, compared to positions, at which the information distribution of the scene is lower. In other words, a preselection of "interesting" areas of the scene is performed so that generally the average integration time is higher at those "interesting" areas that have a higher information distribution, in particular where the object to be scanned, e.g. a person, is positioned, compared to other positions, at which the information distribution of the scene is lower, e.g. showing only the background. This contributes to an increase of the temperature resolution of the image reconstructed from the radiation signals.

For implementing the present invention is sufficient that the passive radiometric imaging device comprises a single radiometer for detecting radiation emitted from a spot representing a single pixel. According to other embodiments, however, by which the total scanning time of a scene can be reduced, the radiometer comprises a line or array of radiometer units for detecting radiation emitted from a spot representing a line or array of pixels. In other words, each of the radiometer units detects radiation from a sub-spot, said sub-spots together representing said spot. In this way, radiation from a number (e.g. a line or array) of pixels is simultaneously detected. Preferably, said radiometer units are simultaneously and equally moved or their sensitivity profiles are simultaneously and equally changed. Generally, however, it is also possible that each radiometer unit is individually controlled and that their sub-spots are individually (and differently) moved.

Preferably, the radiometer is adapted for detecting radiation emitted in a millimeter wavelength range, in particular in a wavelength range from 0.1 to 100 mm, preferably from 1 to 10 mm. As mentioned above, this frequency range has the ability to penetrate non-metal materials, including plastics, walls, clothes, smoke and fog, which is an important property for applications of the presented device and method. Particularly the achievable spatial resolution of few millimetres is very interesting in security applications like concealed weapon or explosives detection. Generally, the invention is also applicable for other frequency ranges. However, some frequencies are less or not usable due to atmosphere absorption properties (the propagation attenuation is too high to receive some useful signal).

According to another aspect of the present invention there is provided a passive radiometric imaging device for imaging a scene, said device comprising:

a radiation detection means for detecting radiation emitted in a predetermined spectral range from a spot of said scene and for generating a radiation signal from said detected radiation, a spot movement means for effecting a movement of the spot, from which the radiation is detected, to various positions, a control means for controlling said spot movement means to effect the movement of the spot from one position to another position after a random time interval, and a processing means for processing the radiation signals detected from the spot at said various positions and for reconstructing an image of said scene by applying compressive sensing.

BRIEF DESCRIPTION OF DRAWINGS

These and other aspects of the present invention will be apparent from and explained in more detail below with reference to the embodiments described hereinafter. In the following drawings

DESCRIPTION OF PREFERRED EMBODIMENTS

Figure 1:
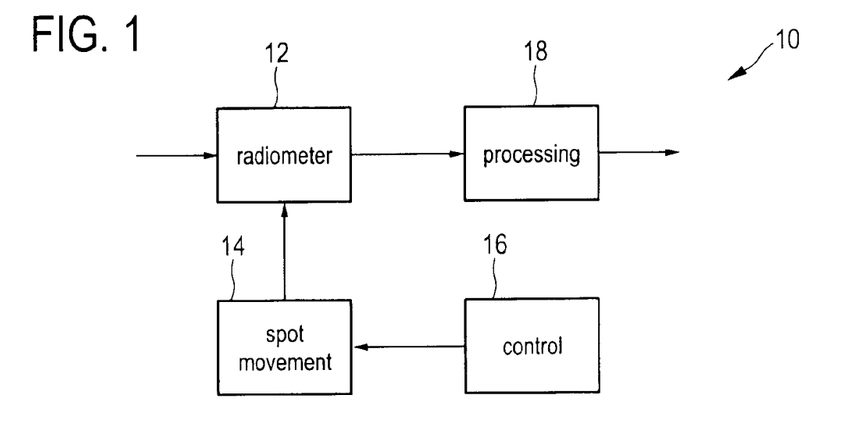
FIG. 1 shows a schematic block diagram of a passive radiometric imaging device according to the present invention.

FIG. 1 shows a schematic block diagram of the general layout of a passive radiometric imaging device 10 according to the present invention for imaging a scene. Said device 10 may, for instance, be used to scan a person in front of a (e.g. neutral) background to detect if the person carries a concealed weapon. The device 10 comprises a radiometer 12 for detecting radiation emitted in a predetermined spectral range from a spot of said scene and for generating a radiation signal from said detected radiation, a spot movement means 14 for effecting a movement of the spot, from which the radiation is detected, to various positions, a control means 16 for controlling said spot movement means 14 to effect the movement of the spot from one position to another position after a random time interval, and a processing means 18 for processing the radiation signals detected from the spot at said various positions and for reconstructing an image of said scene by applying compressive sensing.

Figure 2:
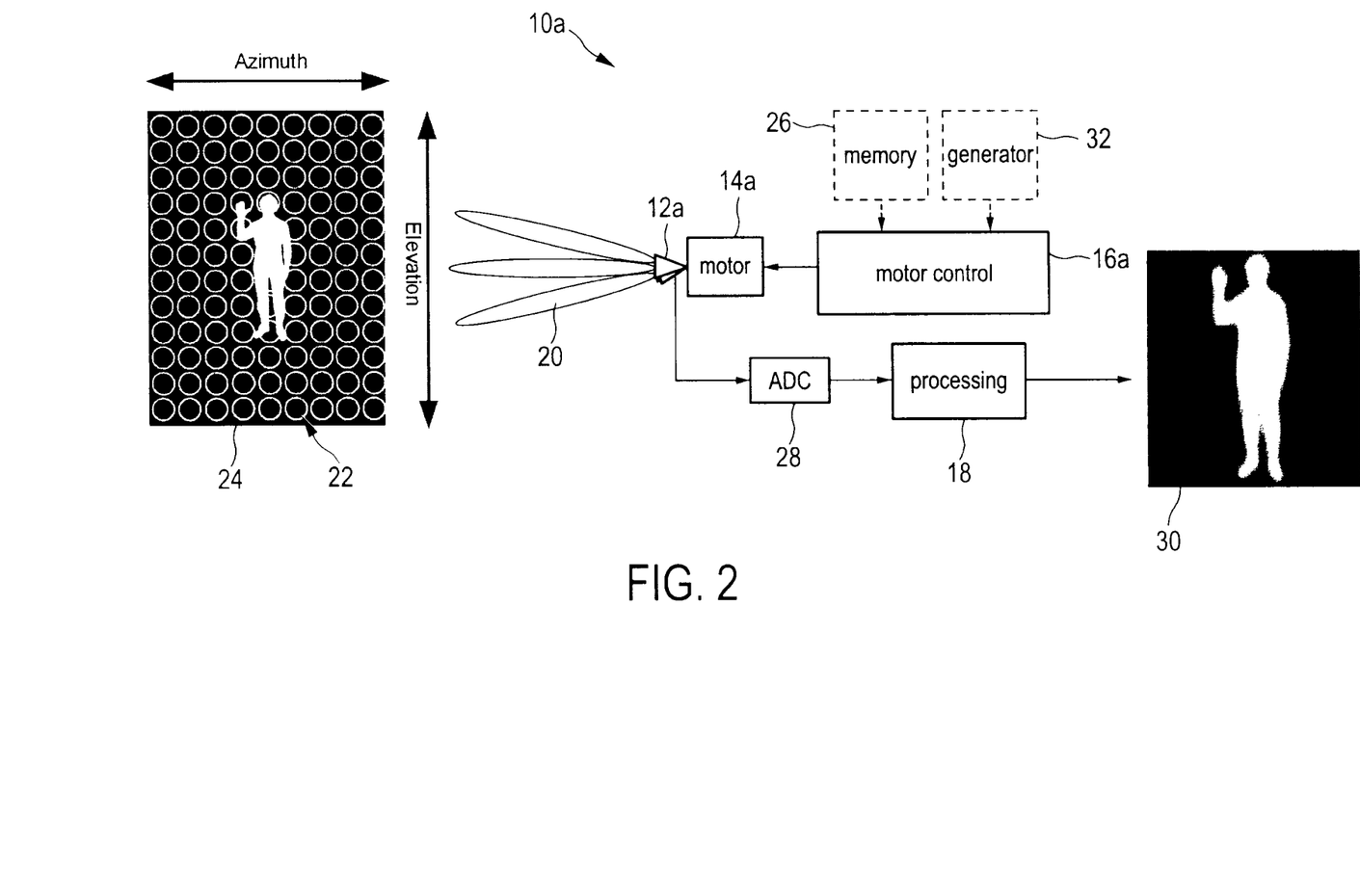
FIG. 2 shows a more detailed schematic block diagram of a first embodiment of an imaging device according to the present invention.

FIG. 2 shows a more detailed block diagram of an embodiment of a passive radiometric imaging device 10a, in which one single radiometer 12a comprises an antenna with a sharp beam 20 which defines the size of the pixel or spot 22, which has a circular shape in this embodiment, by which the scene 24 is scanned and from which radiation is detected. The radiometer 12a including the antenna is attached to a motor 14a, which represents the spot movement means 14. Said motor 14a can move the radiometer 12a, in particular the antenna of the radiometer 12a, in both elevation and azimuth directions to effect a movement of the spot 22 over the scene 24. In this way the complete field of view of the scene 24 is scanned in both dimensions.

At each pixel position, the time the radiometer 12a is collecting the energy radiated from the scene 24, is randomly determined, e.g. selected from some predefined time interval (e.g. [5-10] ms) or from a finite list of discrete possible values (e.g. [5, 5.5, 6, ..., 9.5, 10] ms) stored in a storage unit 26. The selection can be done, for example, by selecting independent and identically distributed values, or it can be done randomly from a uniform Bernoulli or Gaussian distribution. However, several other random distributions could be used as well.

On the other hand, the selection can be done by defining different areas within the scene 24, where the integration time will be longer or shorter depending upon the information distribution of the scene 24. For instance, in areas of the scene with a high information distribution, e.g. where a person is positioned (in the present example in the middle of the scene 24), has on average a larger integration time than areas of the scene with a low information distribution, e.g. where the background is positioned (in the present example in the border areas of the scene 24). Whatever the selection is, a motor control unit 16a is provided for giving the appropriate commands to the motor 14a to stay more or less time at each pixel.

After the scanning of the scene 24 has been completed, the radiation signals obtained from the detected radiation from the various pixels (e.g. obtained by the radiometer 12a while the spot 22 has been positioned at various positions of the scene 24) are provided to a reconstruction unit 18, representing the processing means, preferably after digitization by an analog-to-digital (ADC) converter 28. Said reconstruction unit 18 applies a compressive sensing technique to the acquired samples to finally reconstruct the original image 30.

The exact procedure to select the integration time at each pixel will depend on each application and has to be tuned to obtain the optimum results between image resolution and scanning time. In any case, the overall scene integration time should be less than the scene integration time without applying compressive sensing.

Instead of a storage unit 26 that stores a predefined time interval, a list of discrete possible values or a random distribution for selection of the random integration times, a random generator 32 can be provided for randomly generating the integration time, e.g. each time the spot 22 is moved to a new position. Said random generator 32 can, for instance, be implemented as a pseudo-random number generator, which—based on a randomly selected initial value—generates subsequent values based on a predetermined algorithm.

Figure 3:
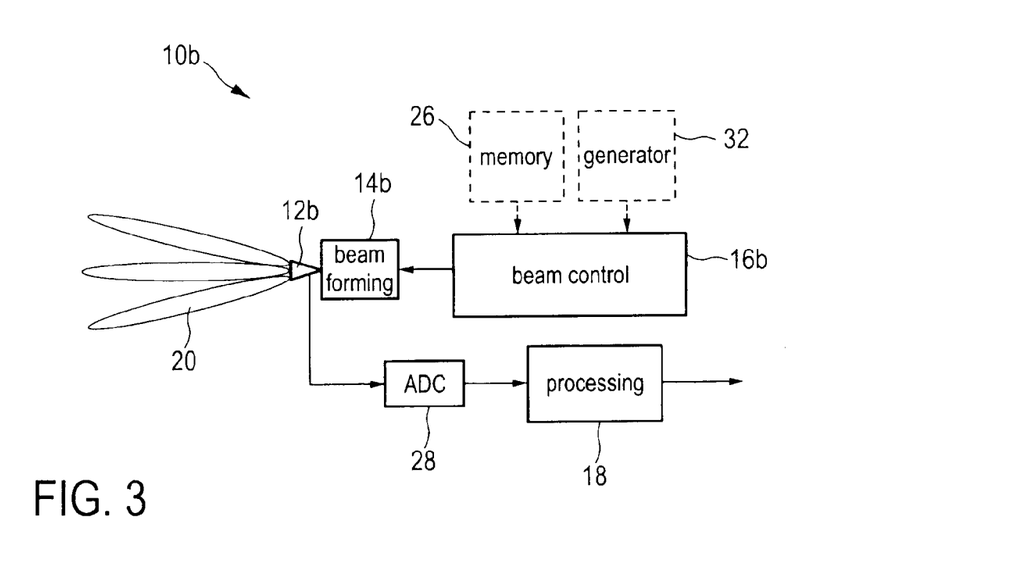
FIG. 3 shows a more detailed schematic block diagram of a second embodiment of an imaging device according to the present invention.

FIG. 3 shows a block diagram of another embodiment of a passive radiometric imaging device 10b. In this embodiment the radiometer 12b (including the antenna) is not mechanically moved by a motor (or other mechanical movement means) for effecting a movement of the spot 22 over the scene 24, but the electronic spot movement means 14b are provided for electronically moving/positioning the sensitivity profile of said radiometer for effecting a movement of said spot. Said electronic spot movement means 14b are, for instance, implemented by an electronic beam positioning means or an electronic beam forming means. An example of such a digital beam forming means is described by N. A. Salmon et al. in "Digital Beam-Forming for Passive Millimitre Wave Security Imaging" in Antennas and Propagation, 2007, EuCAP 2007, November 2007 pp. 1-11. These electronic spot movement means 14b are controlled by a beam control unit 16b, which—like the motor control unit 16a shown in FIG. 2—randomly selects the integration times at the various positions of the spot 22.

Next, the basics of compressive sensing shall be generally explained.

The sensing mechanism of obtaining information about a signal x can be expressed as the correlation of the signal itself with a base of waveforms ($\phi_i$):

$$y_k = \langle x, \phi_k \rangle, \; k=1, \ldots, N.$$

Figure 4:
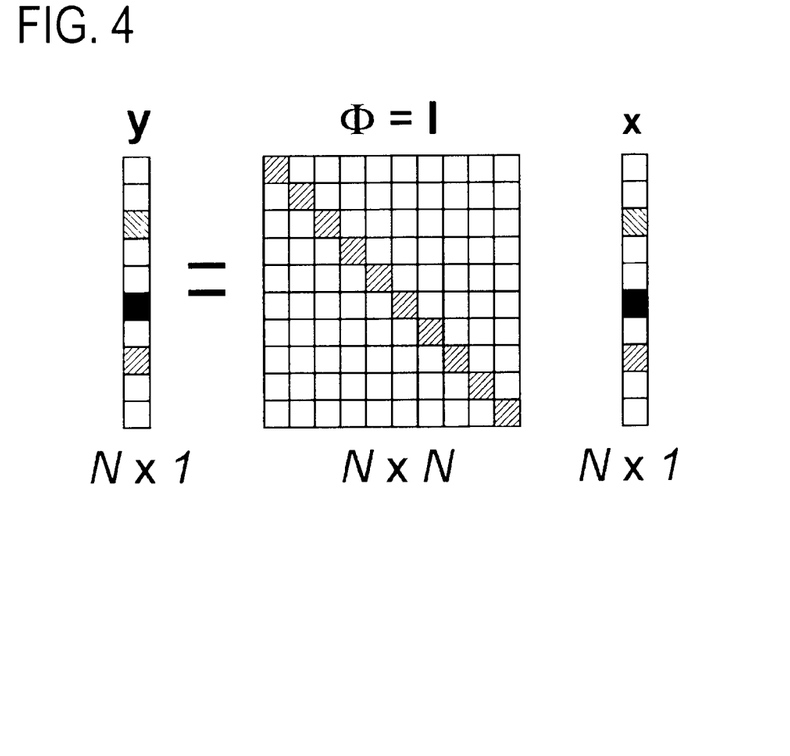
FIG. 4 shows a diagram illustrating traditional sampling.

If for example the sensing waveforms are the Dirac delta functions, then y is a vector of sampled values of x in the time or space domain. If the sensing waveforms are sinusoids, as it happens e.g. in magnetic resonance imaging (MRI), then y is a vector of Fourier coefficients. These sensing waveforms form an orthonormal base which is called the sensing orthobase, or the sensing or measuring matrix, when the sensing operation is expressed in matrix format. FIG. 4 shows an example of this for the Dirac's deltas case.

From FIG. 4 it can also be observed that, although the signal of interest x has only three non-zero elements, all the N positions in the vector are sampled by the measuring matrix. The position in the vector of the non-zero elements is not known, and therefore it is not possible to design a measuring matrix that samples the signal x at exactly those positions. However, this raises the question about if it would be possible to design a sensing matrix which would allow us to just take a small number M of measurements in comparison with the dimension of the signal (M<<N), and still be able to recover the signal. This is exactly what compressive sensing tries to achieve: to completely recover a signal or to obtain a good very approximation of it, form only a few measurements. The success of applying the compressive sensing paradigm to a signal or image relies on two principles: sparsity, which is related to the signal of interest, and incoherence, which pertains to the sampling modality.

Figure 5A:
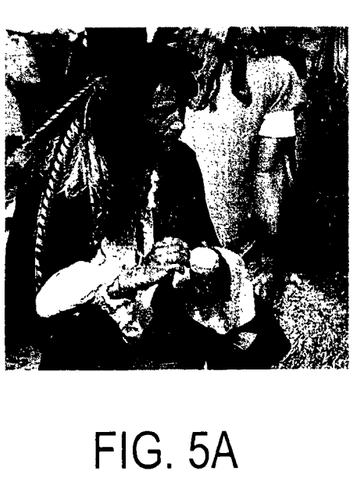
FIG. 5 shows an original image and an image reconstructed from only a portion of wavelet coefficients of the original image.
Figure 5B:
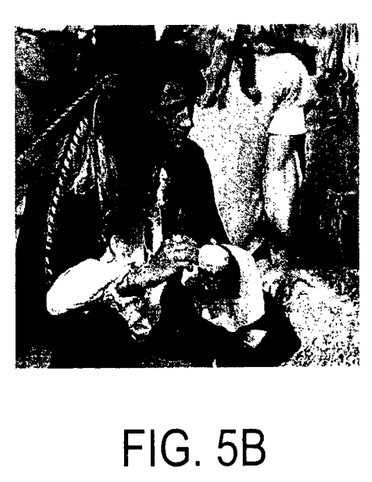
Figure 6:
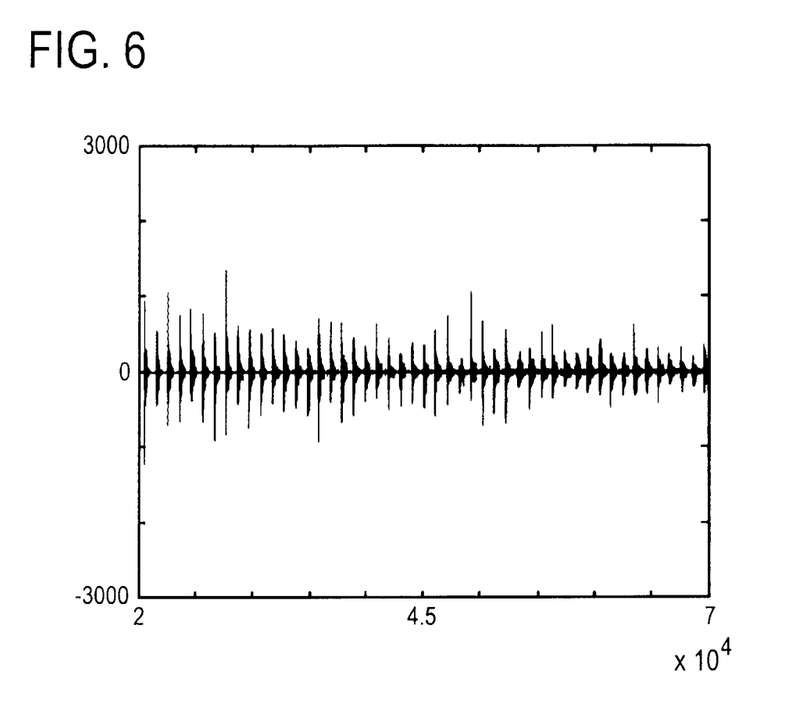
FIG. 6 shows the wavelet coefficients of the image shown in FIG. 5A.

Sparsity expresses the idea that the information rate of a signal may be much smaller than what its bandwidth suggest. In fact, many natural signals have concise representations when expressed in a conventional basis. Considering for example the (complete) image depicted in FIG. 5A and its wavelet transform depicted in FIG. 5B. Although nearly all the image pixels have non-zero values, as shown in FIG. 6, most of the wavelet coefficients are small and the relatively few large ones capture most of the information: the difference between the original image (FIG. 5A) and the reconstructed image (FIG. 5B) obtained by using only the 25.000 largest coefficients is hardly noticeable.

Let x be a real-valued, finite-length, one-dimensional discrete time signal which can viewed as an N×1 column vector in $\mathbb{R}^N$ with elements x[n], n=1, 2, ..., N. Any signal in $\mathbb{R}^N$ can be represented in terms of a orthonormal basis of N×1 vectors $\{\psi_i\}$ i=1, 2, ..., N. Using the N×N basis matrix $\Psi=[\psi_1, \psi_2, \ldots, \psi_N]$ with the vectors $\{\psi_i\}$ as columns, a signal x can be expressed as $$x = \sum_{i=1}^{N} s_i \psi_i \; \text{or} \; x = \Psi s$$

where s is the N×1 column vector of weighting coefficients $s_i = \langle x, \psi_i \rangle = \psi_i^T x$. Clearly s and x are equivalent representations of the same signal but in different domains.

The signal x is K-sparse if it is a linear combination of only K basis vectors; that is, only K of the $s_i$ coefficients are non-zero and (N-K) are zero. The case of interest is when K<<N. The signal x is compressible if the previous representation has just few large coefficients and many small coefficients.

The measurement matrix $\Phi$ must allow the reconstruction of the length-N signal x from M<N measurements (the vector y). Since M<N, this problem appears ill-conditioned, but if x is K-sparse and the K locations of the non-zero coefficients in s are known, then the problem could be solved provided M≥K. A necessary and sufficient condition for this simplified problem to be well conditioned is that, for any vector v sharing the same K non-zero entries as s and for some >0

$$1 - \varepsilon \leq \frac{\|\Phi \Psi v\|_2}{\|v\|_2} \leq 1 + \varepsilon.$$

That is, the matrix $\Omega = \Phi \Psi$ must preserve the lengths of these particular K-sparse vectors. Of course, in general the locations of the K non-zero entries in s are not known. However, a sufficient condition for a stable solution for both K-sparse and compressible signals is that $\Omega$ satisfies this equation for an arbitrary 3K-sparse vector v. This condition is referred to as the restricted isometry property (RIP). A related condition, referred to as incoherence, requires that the rows $\{\phi_j\}$ of $\Phi$ cannot sparsely represent the columns $\{\psi_i\}$ of $\Psi$ (and vice versa).

Direct construction of a measurement matrix $\Phi$ such that $\Omega$ has the RIP, requires verifying the equation for each of the $$\binom{N}{K}$$

possible combinations of K non-zero entries in the vector v of length N. However, both the RIP and incoherence can be achieved with high probability simply by selecting $\Phi$ as a random matrix.

Suppose a pair $(\Phi, \Psi)$ of orthobases is provided in $\mathbb{R}^N$. The first basis $\Phi$ is used for sensing the signal x and the second one is used to represent x. The coherence between the measurement basis $\Phi$ and the representation basis $\Psi$ is defined as:

$$\mu(\Phi, \Psi) = \sqrt{N} \cdot \max_{1 \leq k, j \leq n} |\langle \phi_k, \psi_k \rangle| \qquad \mu(\Phi, \Psi) \in [1, \sqrt{N}].$$

That is, the coherence measures the largest correlation between any two elements of $\Phi$ and $\Psi$. If $\Phi$ and $\Psi$ contains correlated elements, the coherence is large, otherwise it is small. In any case it can be demonstrated that $\mu(\Phi, \Psi) \in [1, \sqrt{N}]$.

Compressive sensing is mainly concerned with low coherence pairs. For example, in the classical sampling scheme in time or space where $\Phi$ and $\Psi$ are the spike and Fourier basis respectively, the coherence is $\mu = 1$ and, therefore maximal incoherence is given. In another example, wavelets are taken for $\Psi$ and noiselets for $\Phi$. In the case of Haar wavelets $\mu = \sqrt{2}$ and in the case of Daubechies D4 and D8 the incoherence is about 2.2 and 2.9 respectively.

However, the most interesting result is that random matrices are largely incoherent with any fixed basis $\Psi$. Just select an orthobasis $\Phi$ uniformly at random, e.g. by orthonormalizing N vectors sampled independently and uniformly on the unit sphere. Then, whit high probability, the coherence between $\Phi$ and $\Psi$ is about $\sqrt{2 \log N}$. By extension, random waveforms with independent identically distributed (i.i.d.) entries like Gaussian or ±1 binary entries will also exhibit very low coherence with any fixed representation basis $\Psi$.

Next, the compressive sensing theorem shall be explained. Let x be a signal in $\mathbb{R}^N$ which is K-sparse in the basis $\Psi$. Select M<<N measurements in the $\Phi$ domain uniformly at random. Then if $$M \geq C \cdot \mu^2(\Phi, \Psi) \cdot K \cdot \log N$$

for some positive constant C, then the signal x can be exactly recovered with over-whelming probability. The recovering of the signal x is done by means of a convex minimization which does not assume any knowledge about the number of non-zero coordinates of x, their locations or amplitudes, which are assumed to be all completely unknown a priori. It is just needed to run the algorithm, and if the signal happens to be sufficient sparse, exact recovery happens.

The role of the coherence is obvious from the theorem: the smaller the coherence, the fewer samples need to be taken. If $\mu$ is equal or close to one, then a number of samples in the order of K log N suffices to recover the signal. For practical cases it is used to take M at least three times larger than M≥3K.

Figure 7:
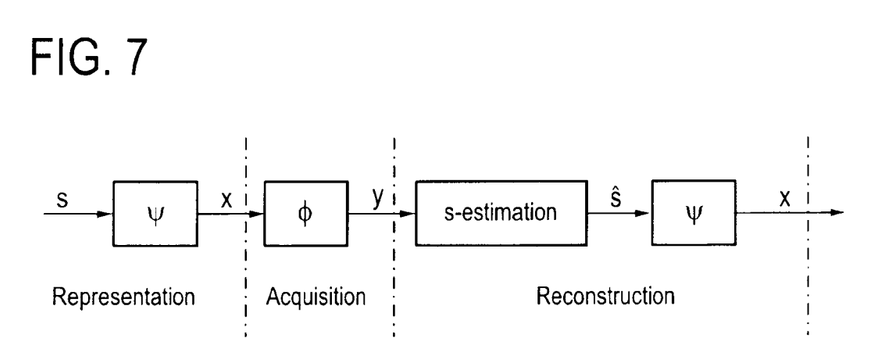
FIG. 7 shows a diagram illustrating the steps of a compressive sensing method in general.

The signal reconstruction algorithm must take the M measurements in the vector y, the random measurement matrix $\Phi$ and the representation basis $\Psi$ and reconstruct the N-length signal x as schematically depicted in FIG. 7.

In order to reconstruct x the coefficients s must be estimated. As it is tried to recover a sparse signal, the problem can be reduced to find out, among all the possible coefficient vectors s satisfying the observed measurements (that is y=$\Phi \Psi$s), the sparsest one ($_p$), that is, the one with the maximum number or zero coefficients or, the other way around, the one with the minimum number of non-zero coefficients. Mathematically this can be formulated as solving the following minimization problem:

$$\hat{s}_p = \min_s \|s\|_p \text{ subject to } y = \Phi \Psi s = \Omega s$$

where $\Omega \equiv \Phi \Psi$ and $\|.\|_p$ denotes the $l_p$ norm defined by $$\|s\|_p = \left( \sum_{i=1}^{N} |s_i|^p \right)^{1/p}.$$

The norm $l_0$ (p=0) counts the number of non-zero entries in s. Therefore the minimization problem finds out what is looked for: the $_p$ with less non-zero coefficients. Unfortunately this minimization problem is both numerically unstable and NP-complete, requiring and exhaustive enumeration of all $$\binom{N}{K}$$

possible locations of the non-zero entries in s.

Figure 8:
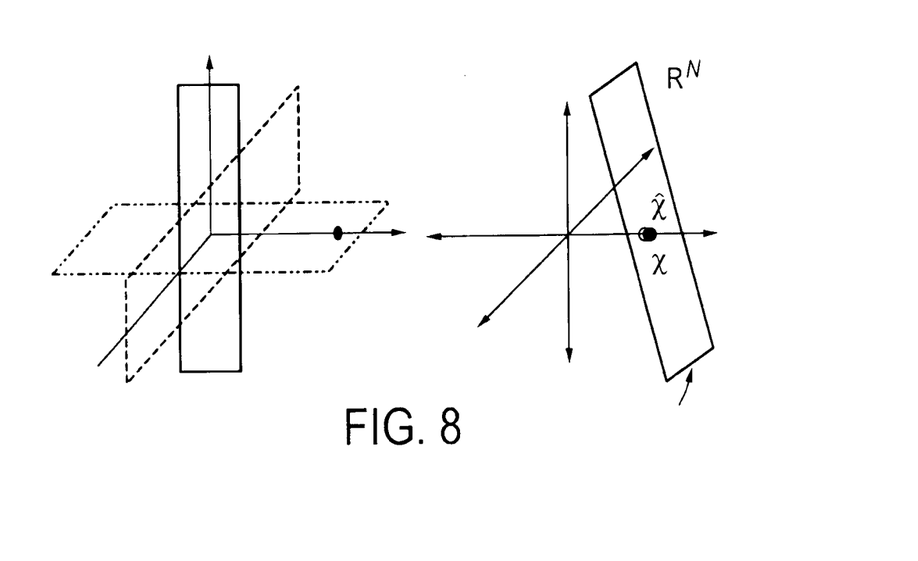
FIG. 8 shows sparse vectors in $\mathbb{R}^3$ and norm l0.

The problem can be better visualized by means of the space geometry. Vectors in $\mathbb{R}^3$ with K=1 and K=2 represent a plane and a point located at one coordinate axis respectively as shown in FIG. 8. The minimization problem with the $l_0$-norm would find out exactly those N-dimensional K-sparse surfaces but, as above mentioned, this problem can not be solved.

Figure 9A:
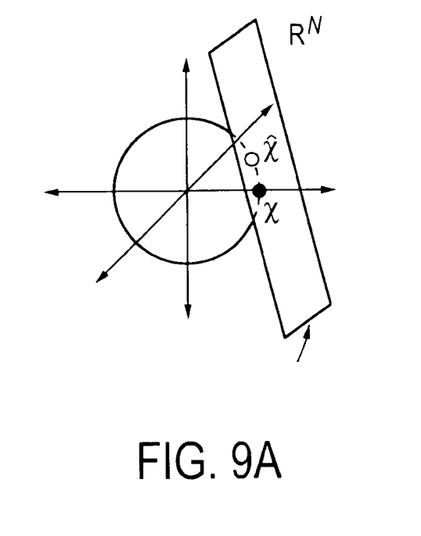
FIG. 9 shows geometrical solutions for norms l2 and l1.

The classical approach to solve inverse problems like this one is to find the vector with the minimum energy, that is, with the minimum $l_2$-norm. The problem in this case can be solved using linear programming techniques, but the solution would almost never be the K-sparse solution that is looked for in the field of application of the present invention, but a non-sparse one with many non-zero coefficients. Geometrically the minimization problem with the $l_2$-norm finds out the point-of-contact with a minimum energy hypersphere but, due to the random orientation of the surface, that contact point will be unlikely to be located at any coordinate axis, and therefore it would not be a sparse solution as illustrated in FIG. 9A.

Figure 9B:
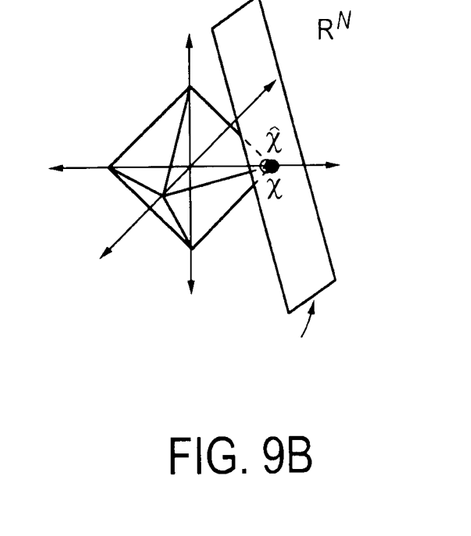

Surprisingly, the optimization based on $l_1$-norm can exactly recover K-sparse signals and closely approximate compressive signals. As it can be seen in FIG. 9B, the $l_1$ ball has points aligned with the coordinate axis. Therefore, when the $l_1$ ball is blown up, it will first contact the surface in one of these points, which is exactly where the sparse vector s is located.

This problem of recovery of a signal of order N from a number of measurements M<<N is combinatorial and NP-hard. Thus, a series of pursuit methods were developed to reduce computational complexity by searching efficient but non-optimal approximations.

The $l_1$ minimization principle, also known as Basic Pursuit (BP), tries to find the representation of a signal whose coefficients have minimal $l_1$ norm. This is done by iterative improving an initial basis until no improvement is possible, at which point the solution is achieved. This requires the solution of a convex optimization problem which can be reformulated as a linear programming problem (LP) and therefore, any algorithm from the LP literature can be considered as a candidate for solving the BP optimization problem. Some of these candidates are for example the simplex algorithm, the slow but extremely accurate interior point algorithm, the fast first-order gradient projection algorithm, etc.:

$$\min_x \|x\|_l \text{ subject to } \Phi x = y$$

Several variations of the basic $l_1$ minimization problem have been also proposed like the quadratic relaxation, also known by LASSO, $$\min_x \|x\|_l \text{ subject to } \|\Phi x - y\|_2 \leq \varepsilon$$

or the Dantzing selector $$\min_x \|x\|_l \text{ subject to } \|\Phi^T(\Phi x - y)\|_\infty \leq \varepsilon$$

While BP is a principle of global optimization without any specified algorithm, another recovery technique called Orthogonal Matching Pursuit (OMP) is actually an iterative algorithm, which does not explicitly seek for any overall goal, but merely applies a simple rule repeatedly. If OMP is compared with the simplex algorithm for BP, the first one starts from an empty model and builds up a signal model at each step. On the contrary, the BP-simplex starts from the full model and tries to improve it by taking relatively useless terms out of the model in every step.

The algorithm consist basically in select a first "active" component by finding out which column of $\Phi$ is most correlated with y and subtract off of y to form the residual y'. Then the procedure is repeated for with y' as starting active component. The algorithm orthogonalizes the "active set" between iterations and it is very fast for small scale problems. However, it is not very accurate or robust for large signals in presence of noise.

For large systems, a good approximation to the sparsest solution can be obtained by iterative thresholding algorithms running much more rapidly than general solvers. The idea is to guess a solution $y_k$ and backproject it to get an estimated $x_k = \Phi T \Phi y_k$. This one is then thresholded to obtain $y_{k+1}$. It works since in the sparse signals the $x_k$ will be big in the active set and very small elsewhere. Is a procedure analog to BP but it is very fast and works very well for sparse signals and relatively fine for recovering approximately sparse (compressible) signals.

A sparsifying transform is an operator mapping a vector of image to a sparse vector. An extensive research in sparse image representation in the recent years has produced a library of diverse transformations that can sparsify many different types of images. For example, piecewise constant images can be sparsely represented by spatial finite-differences (i.e. computing the difference between neighbouring pixels), because away from boundaries, the differences vanishes. The sparsity level is equal to the number of "jumps" in the image. This is similar to do a high-pass filtering operation.

Using the sparsifying property of the Total Variation (TV) transform, and considering that the TV norm of an object is approximately the $l_1$ norm of its gradient, the compressive sensing recovery problem can be reformulated as:

$$\min_x TV(x) \approx \|\nabla x\|_l \text{ subject to } \Phi x = y$$

This is also a convex problem which can be solved with interior point methods. It is an accurate and robust minimization method for recovering images, although it can be slow.

Applying these general considerations in the proposed passive radiometric imaging device and method means that to the acquired detection signals a l1-norm minimization algorithm, as generally applied above, is applied. However it is important to note that in this case we are not taking fewer measurements than in a normal scanning. The necessary incoherence is achieved according to the present invention through the randomization of the integration time, not by takingfewer samples at random positions.

Figure 11A:
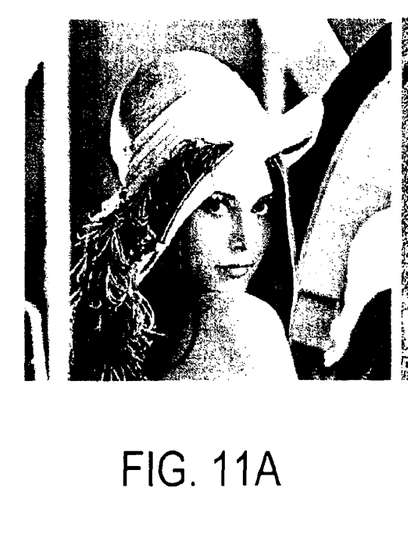
FIG. 11 shows an example of the application of the total variation transform to a sample picture.
Figure 11B:
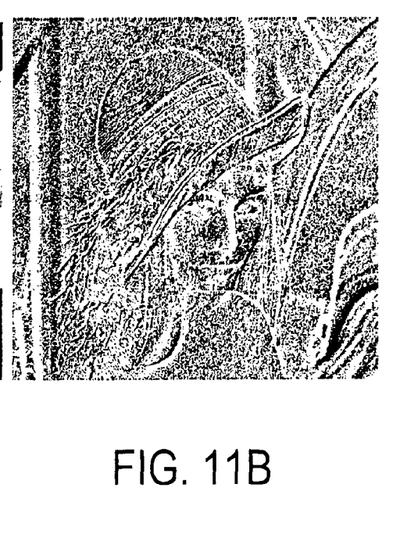

Lets take as example the scene 24 shown in FIG. 2 which can be represented as a vector x of length N. As this picture is obviously piecewise constant it can be sparsified by applying the total variation (TV) transform. This sparsity transformation is obvious by just looking at the result of calculating the total variation of the image. A second image using the reference picture Lena is shown in FIG. 11A to appreciate the sparsity effect of the TV transform in a more general image (as shown in FIG. 11B). In other words, this TV transform obtains a sparse representation when it is applied to a piecewise smooth image. The radiometric images, which are dealt with by the present invention, are also piecewise constant and therefore the TV transformation will produce a sparse image too.

A radiometer produces an output voltage which is proportional to the Plank's law that describes the spectral radiance of electromagnetic radiation at all wavelengths from a black body at temperature T:

$$I(f, T) = \frac{2hf^3}{c^2} \frac{1}{e^{\frac{hf}{kT}} - 1}$$

where h and k are the Plank's and Boltzmann's constant respectively, f is the frequency, c is the speed of light and T is the temperature of the body being measured. This formula represents the emitted power per unit area of emitting surface, per unit solid angle, and per unit frequency.

To calculate the total energy received in the radiometer (irradiance) per unit area of radiating surface, it is necessary to integrate the spectral radiance over the complete frequency band of the radiometer-receiver system.

$$J(T) = \frac{2h}{c^2} \int_{f_{min}}^{f_{max}} \frac{f^3}{e^{\frac{hf}{kT}} - 1}.$$

Furthermore, to obtain the total radiated energy per spot (pixel) this value has to be multiplied by the area covered by one spot (A), which in turns depends on the radiation pattern of the antenna element:

$$J(T) = A \frac{2h}{c^2} \int_{f_{min}}^{f_{max}} \frac{f^3}{e^{\frac{hf}{kT}} - 1}.$$

The radiometer receives also noise mixed with the signal. This noise comes from several sources, but this is out of the scope of this invention and therefore will be not treated here. It is enough to know that it is necessary to collect sufficient energy to compensate the incoming as well as the own system noise. This can be done increasing the integral interval (the bandwidth) or collecting and summing up the energy during a certain amount of time (integration time):

$$J(T) \cdot \tau = \left[ \frac{A2h}{c^2} \int_{f_{min}}^{f_{max}} \frac{f^3}{e^{\frac{hf}{kT}} - 1} \right] \cdot \tau.$$

Therefore, the process of scanning the scene with a device like the one depicted in the FIG. 2, employing a random integration time for each pixel can be described as taking the measurements:

$$y = \Phi x = \begin{bmatrix} \tau_{11} & 0 & \ldots & \ldots & 0 \\ 0 & \tau_{22} & 0 & \ldots & \ldots \\ 0 & 0 & \tau_{ii} & \ldots & \ldots \\ 0 & 0 & 0 & \ldots & \ldots \\ 0 & 0 & 0 & 0 & \tau_{NN} \end{bmatrix} \cdot \begin{bmatrix} \left[\frac{2hA}{c^2}\right] \int_{f_{min}}^{f_{max}} \frac{f^3}{e^{\frac{hf}{kT_1}} - 1} \\ \vdots \\ \left[\frac{2hA}{c^2}\right] \int_{f_{min}}^{f_{max}} \frac{f^3}{e^{\frac{hf}{kT_N}} - 1} \end{bmatrix}$$

where the measurement matrix consists of a random integration times for each pixel in the image.

The desired reconstruction of the radiometric image is then achieved by applying the total variation version of the l1 minimization algorithm described above using some known linear program method like the basis pursuit algorithm or some non-linear algorithm like the Fletcher-Reeves conjugate gradient iterative scheme described in R. Fletcher and C. M. Reeves, "Function minimization by conjugate gradients", The computer Journal, vol. 7, no. 2, pp. 149-154, 1964. The minimization algorithm will find the sparsest image in the total variation domain that matches the measurements.

The l1-minimization is a well known technique, that has generally also been briefly explained above. Furthermore, the linear programs or non-linear algorithms available to solve convex problems like a l1-minimization problem are also well known.

The proposed idea is not limited to a passive radiometric imaging device using a single radiometer, as shown in FIGS. 2 and 3, which scans the scene sequentially. It can also be applied to a device 10c employing a radiometer 12c comprising multiple radiometer units 13 in a line or array distribution, as schematically depicted as an embodiment in FIG. 10. The spots of the individual radiometer units 13 are moved by the spot movement means 14c under control of the controller 16c, wherein the spots can either be individually (e.g. differently) moved, or can be simultaneously and identically moved (e.g. into the same direction, with the same speed, . . . ). Hence, with such an embodiment measurement time can be saved compared to an embodiment having only a single radiometer unit 13 due to simultaneous measurement of radiation from various spots.

Figure 10:
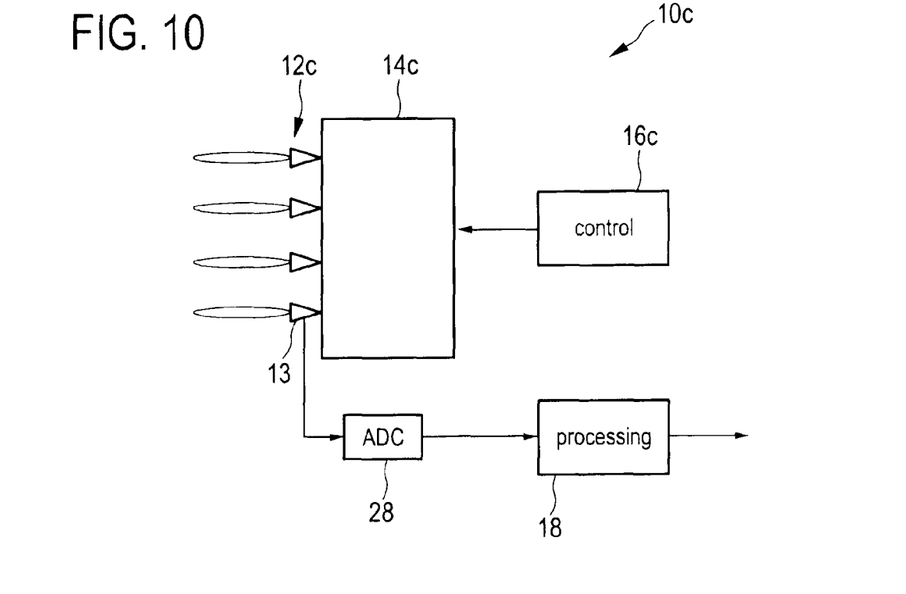
FIG. 10 shows a schematic block diagram illustrating a third embodiment of an imaging device according to the present invention.

Alternatively, it is also possible that one radiometer unit (or a first group of radiometer units) is detecting radiation while the spot(s) of another radiometer unit (or another group of radiometer units) is (are) moved to another position(s).

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A passive radiometric imaging device for scanning a scene, said device comprising:
    a radiometer that detects radiation emitted in a predetermined spectral range from a spot of said scene, and that generates radiation signals based on the detected radiation,
    a spot movement device that effects movement of the spot, at which the radiation is detected, to various positions of said scene, a controller that controls said spot movement device to effect the movement of the spot from one position to another position of the various positions after a random time interval, and a processor that processes the generated radiation signals to reconstruct an image of said scene using compressive sensing.

2. The passive radiometric imaging device as claimed in claim 1, wherein said processor is adapted to reconstruct the image by applying a l1-norm minimization algorithm to the radiation signals.

3. The passive radiometric imaging device as claimed in claim 1 or 2, wherein said spot movement device includes a mechanical component that mechanically moves the radiometer with respect to said scene to effect the movement of the spot.

4. The passive radiometric imaging device as claimed in claim 1 or 2, wherein said spot movement device includes circuitry that electronically moves a sensitivity profile of said radiometer to effect the movement of the spot, the moving circuitry including electronic beam positioning circuitry or electronic beam forming circuitry.

5. The passive radiometric imaging device as claimed in claim 1 or 2, wherein said spot movement device is adapted to effect continuous movement of the spot over said scene, wherein a speed of the continuous movement varies randomly.

6. The passive radiometric imaging device as claimed in claim 1 or 2, wherein said spot movement device is adapted to effect the movement of the spot such that said scene is completely scanned, the spot being sequentially moved over said scene along a continuous trajectory.

7. The passive radiometric imaging device as claimed in claim 1 or 2, wherein the radiation signals have a sparse representation in a known domain, the known domain including one of a total variation domain, a Fourier domain, a wavelets domain, and a curvelets domain.

8. The passive radiometric imaging device as claimed in claim 1 or 2, wherein said controller is adapted to select the random time interval for which the spot remains at one of the various positions from a predetermined time interval or from a table of selectable time intervals.

9. The passive radiometric imaging device as claimed in claim 1 or 2, wherein said controller is adapted to determine the time interval for which the spot remains at one of the various positions using a predetermined function or distribution, including a uniform Bernoulli or a Gaussian distribution.

10. The passive radiometric imaging device as claimed in claim 1 or 2, wherein said controller is adapted to select an average time interval associated with the random time interval to be larger at positions at which said scene has a first information distribution than at positions at which said scene has a second information distribution lower than the first information distribution.

11. The passive radiometric imaging device as claimed in claim 1 or 2, wherein said radiometer includes a single radiometer unit that detects radiation emitted from the spot, where the spot represents single pixel of said scene.

12. The passive radiometric imaging device as claimed in claim 1 or 2, wherein said radiometer includes a line or an array of radiometer units that detects the radiation emitted from the spot represented by a line or an array of pixels, respectively.

13. The passive radiometric imaging device as claimed in claim 1 or 2, wherein said radiometer is adapted to detect radiation emitted in a millimeter wavelength range, the wavelength range being one of from 0.1 to 100 mm and from 1 to 10 mm.

14. A passive radiometric imaging method for scanning a scene, said method comprising:

detecting radiation emitted in a predetermined spectral range from a spot of said scene, and generating radiation signals based on the detected radiation, moving the spot, at which the radiation is detected, to various positions of said scene, controlling the movement of the spot so that the spot moves from one position to another position of the various positions after a random time interval, and processing the detected radiation signals to reconstruct an image of said scene using compressive sensing.

15. A computer-readable non-transitory medium having instructions stored thereon which, when carried out on a computer, cause the computer to perform the method as claimed in claim 14 in a passive radiometric imaging system as claimed in claim 15.

16. A passive radiometric imaging system for scanning a scene, said system comprising:

radiation detection circuitry that detects radiation emitted in a predetermined spectral range from a spot of said scene, and that generates radiation signals based on the detected radiation, spot movement circuitry that effects movement of the spot, at which the radiation is detected, to various positions of said scene, control circuitry that controls said spot movement circuitry to effect the movement of the spot from one position to another position of the various positions after a random time interval, and processing circuitry that processes the detected radiation signals to reconstruct an image of said scene using compressive sensing.

* * * * *